Patented Mar. 10, 1942

2,276,138

UNITED STATES PATENT OFFICE 2,276,138

VINYLARYL ESTERS

Van Vernon Alderman, Arden, and William Edward Hanford, Wilmington, Del., assignors to E. I. du Pont de Nemours & Company, Wilmington, Del., a corporation of Delaware No Drawing. Application April 30, 1940, Serial No. 332,608

20 Claims. (Cl. 260—85)

This invention relates to organic compounds and more particularly to unsaturated organic compounds and their polymers.

This invention has as an object a class of new monomeric compounds. Another object is a class of polymers, including copolymers of these compounds. Another object is the provision of processes for obtaining these monomers, and their polymers, including their copolymers. A further object is the provision of a process for making useful hydrolytic polymeric products. A still further object is the provision of tanning agents and dyestuffs, plastics, molding compositions, coating compositions. Other objects will appear hereinafter.

These objects are accomplished by the following invention which comprises monomeric esters of vinylphenols, preferably monocyclic, and polymers, including copolymers of the same, particularly with vinyl and vinylidene compounds, the preparation of said monomers by the pyrolytic dehydroacylation of the diesters of hydroxyphenylmethylcarbinol, and the hydrolysis of the polymeric vinylphenyl esters to polymeric vinylphenols.

This invention may be illustrated starting with the preparation of p-vinylphenyl acetate. Monomeric p-vinylphenyl acetate is prepared by the pyrolytic dehydroacetylation of the diacetate of p-hydroxyphenylmethyl carbinol, itself obtained by acetic acid esterification of the catalytic reduction product of p-hydroxyacetophenone. A solution of p-hydroxyacetophenone in an appropriate solvent such as methanol is hydrogenated at a moderate temperature and pressure using a nickel catalyst prepared by treating a finely divided alloy of nickel and an alkali soluble metal such as aluminum with an excess of caustic alkali solution, this catalyst being commonly known as Raney nickel catalyst.

The resulting p-hydroxyphenylmethyl carbinol is isolated by distillation of the solution. This carbinol is acetylated and the diacetate pyrolyzed at temperatures preferably in the neighborhood of 500° C. to give p-vinyl-phenyl acetate in excellent yield.

This monomer polymerizes and copolymerizes with vinyl or vinylidene compounds such as methyl methacrylate and styrene even at low temperature (e. g., 0° C.) and in the dark. Peroxide catalysts accelerate this polymerization as does also exposure to a Cooper Hewitt mercury arc, of the monomer in a "Pyrex" glass vessel. The monomer and its polymer and copolymers are hydrolyzed to polymers containing free phenolic groups by the action of such agents as aqueous acids and alkalies.

The following examples wherein parts are by weight illustrate the preparation of the monomeric p-vinylphenyl acetate.

EXAMPLE A p-Hydroxyphenylmethyl carbinol

A solution of 100 parts p-hydroxyacetophenone and 100 parts of methanol is hydrogenated under 2,000 lb. pressure at 70–80° C. in the presence of 10 parts of Raney nickel catalyst until the theoretical amount of hydrogen is taken up; the resulting solution is filtered from the catalyst and the filtrate concentrated. By collecting the crystals formed and further evaporating the filtrate, 75 parts or a 70% yield of p-hydroxyphenylmethylcarbinol is obtained. After recrystallization from a 20% solution of ethanol in benzene, it melts at 130–131° C.

Analysis: Calcd. for $C_8H_{10}O_2$: C, 69.56%; H, 7.28%. Found: C, 69.68%; H, 7.52%.

EXAMPLE B

1-(p-Acetoxyphenyl) 1-acetoxyethane

To a solution of 13.8 parts of p-hydroxyphenylmethyl carbinol in 25 parts anhydrous ether and 16 parts dry pyridine is added dropwise a solution of 16 parts acetyl chloride in 25 parts dry ether. After stirring for several hours, 20 parts of water is added. The ether layer is separated and the water layer extracted with ether. The ether extracts are combined, dried over anhydrous magnesium sulfate, filtered, and the ether removed. On distillation, 16 parts or an 80% yield of 1-(p-acetoxyphenyl) 1-acetoxyethane is obtained, boiling at 145–146 C. under 7 mm., M. P. 51° C.

Analysis: Calcd. for $C_{12}H_{14}O_4$: Saponification Number, 504.5. Found: 505.53 and 504.24.

EXAMPLE C p-Vinylphenyl acetate

Thirty eight parts of the diacetate of p-hydroxyphenylmethyl carbinol are dropped at the rate of 1.3 g./min. through a 3 x 45 cm. Pyrex tube packed with 8 x 8 mm. glass rings, maintained at 480° C. This temperature is registered by a thermocouple junction placed outside and half way down the length of the tube. This rate of flow corresponds to a space velocity $(v/v_1)$ of 216 where $v_1$ is the volume of packing and $v$, the total volume of gaseous reactants calculated at 0° C. and 760 mm. which traverse the packing during 1 hour. Direct distillation of the pyrolysate, to which 1% hydroquinone had been added, gives 6 parts of acetic acid, and 14 parts or a 50% yield of p-vinylphenyl acetate boiling at 83–86° C. under 2 mm. pressure; $n_D^{25}$, 1.5368; $d_4^{25}$, 1.0586.

Analysis: Calculated for $C_{10}H_{10}O_2$: Saponification Number 348. Found: 332.8, 339.4

There is left in the flask a small amount of polymeric residue.

When 105 parts of the above diacetate is passed through the same volume of packing and at the same temperature at the rate of 2.3 g./min. (space velocity of 382), 72 parts or a 90% yield of p-vinylphenyl acetate is obtained.

In neither run is an appreciable quantity of diacetate recovered. In the first run more char is observed in the pyrolysis tube.

The more detailed practice of the invention is illustrated by the following examples, wherein parts given are by weight. There are of course many forms of the invention other than these specific embodiments.

EXAMPLE I

*Polymerization of p-vinylphenyl acetate*

In a reaction vessel fitted with a reflux condenser is placed 10 parts of p-vinylphenyl acetate; this flask is evacuated to a pressure of 150 mm. and heated at 90–100° C. for ten days during which time the pressure is gradually reduced to 20 mm. A polymer is obtained which may be molded (10,000 lb./sq. in. at 120° C.) to a colorless, transparent chip softening at 83° C. and having a hardness of 300 g. as determined on a Pfund instrument which measures that weight required to press a quartz ball a fixed depth into the surface of the polymer. The polymer is soluble in methanol, acetone and benzene.

EXAMPLE II

*Copolymer of p-vinylphenyl acetate with styrene*

A mixture of 7.5 parts p-vinylphenyl acetate and 67.5 parts freshly distilled styrene is heated at 80° C. under 80 mm. for approximately five days. The resulting product has a softening point of 63° C., and a 25% solution of it in toluene has a viscosity of 140 centipoises. The polymer is clear and colorless. Styrene homopolymer similarly prepared has a softening point of 108° C. and a viscosity, in 25% solution in toluene, of 2270 centipoises.

EXAMPLE III

*Copolymer of p-vinylphenyl acetate with chloroprene*

A solution of 54 parts 2-chlorobutadiene-1,3, 13.5 parts p-vinylphenyl acetate and 0.675 parts benzoyl peroxide in 54 parts carbon tetrachloride is heated at 80° C. for 10 hours. A thick gel results which is washed thoroughly with alcohol and milled on heated rolls. There is obtained sixty-two parts or a 92% yield of a copolymer which contains 31.07% chlorine. This composition is that of a chloroprene copolymer containing 21.4% p-vinylphenyl acetate.

This rubber shows an improvement over chloroprene in oil resistance; in kerosene the volume % absorption was 58.7% as compared to about 90% for unmodified chloroprene rubber.

EXAMPLE IV

*Copolymer of p-vinylphenyl acetate with methyl methacrylate*

A mixture of 50 parts of methyl methacrylate with 10 parts of p-vinylphenyl acetate is suspended with vigorous stirring in water containing 1% of benzoyl peroxide and 0.3% of a methyl methacrylate-sodium methacrylate interpolymer which acts as a dispersing agent. The polymerization requires 1.75 hours at 85–90° C. and the yield is 88%. A molding of the product is clear, colorless, and comparable with unmodified granular methyl methacrylate polymer in hardness and toughness, and has a higher softening point (108° C.) than unmodified methyl methacrylate.

EXAMPLE V

*Polyvinyl phenol from p-vinylphenyl acetate polymer*

Ten parts of p-vinylphenyl acetate polymer made as in Example I and of similar hardness and toughness, is ground and dissolved in 200 parts absolute methanol containing 0.02 part sodium methylate and heated whereby an ester interchange takes place, giving polyvinyl phenol and methyl acetate. After refluxing overnight the methanol and methyl acetate are distilled off, and the polymer washed with dilute hydrochloric acid and water, redissolved in acetone, and precipitated with water. After several such treatments, the polymer is dried at 100° C. under a pressure of 20 mm., powdered and dried over phosphorous pentoxide. If the original poly-p-vinyl-phenyl acetate and the polymeric phenol derived from it are saponified by treating each for 24 hours with boiling 0.3N alcoholic potassium hydroxide, one part of the polyacetate consumes 0.345 part potassium hydroxide; and one part of the polymeric phenol, only 0.056 part potassium hydroxide. This indicates that about 84% of the acetate groups have been removed from poly-vinylphenyl acetate by the above ester interchange technique, and that in the poly-vinyl-phenol about 16% of the phenolic groups are still blocked by acetate groups. A methanol solution of this material can be flowed and evaporated to hard films, which melt at 230° C. to a very viscous, rubbery liquid, quickly darkening and undergoing decomposition. Resinous polymers are obtained by the treatment of monomeric p-vinylphenyl acetate with potassium hydroxide in methanol, both cold and hot, and with methanol using sulfuric acid as the ester interchange catalyst.

EXAMPLE VI

*Coupling reaction of polyvinyl phenol*

Untreated muslin is impregnated with poly-p-vinylphenol by steeping the fabric in a 10–15% solution of the phenol in methanol, pressing out the excess solution and drying in air. The treated fabric is colored an orange-brown by dipping it into a sodium acetate-buffered solution of p-nitrobenzenediazonium chloride. This color remains fast to a laundering treatment of 14 hours in a solution of 0.1% $Na_2CO_3$ and 0.25% Ivory soap at 100° C. Immersion of a dyed sample in 2% hydrochloric acid for fifteen minutes does not affect the color; immersion in 1% aqueous sodium hydroxide for fifteen minutes leaches out a little color.

The hydrogenation of p-hydroxyacetophenone to p-hydroxyphenylmethylcarbinol need not be conducted on the exact manner indicated in Example A. The ketone may be converted to the carbinol by means of metallic sodium and ethyl alcohol, or the hydrogenation with molecular hydrogen may be carried out at temperatures within the range of 25–150° C. and pressures of, or in excess of 3 atmospheres using any hydrogenating catalyst, e. g., finely divided nickel, elementary nickel, cobalt, copper either alone or supported by such substances as pumice, kieselguhr, silica gel, activated carbon and other hydrogenating metal as the catalysts associated or combined with difficultly reducible metal oxides such as copper chromate. Any solvent inert under the hydrogenation conditions employed may be used.

The acetylation of the p-hydroxyphenylmethylcarbinol may be effected by means of ketene, acetic anhydride, acetyl chloride or other acetyl halide. The acetylation is preferably conducted in the presence of a solvent. Any solvent which is inert to the carbinol and the acetylating agent and which is separable, e. g., by distillation, from the diacetate, may be used. The temperature of acetylation and the concentration of the acetylating agent must be such that acetylation and not dehydration occurs. Temperatures of 0° to 50° C. and concentrations of acetylating agent up to 100% may be employed.

The pyrolysis of the diacetate may be conducted at any temperature within the range of 150–700° C. The diacetate may be passed through at any rate within the range of 0.005 to 0.05 volume per volume of heated space (not occupied by packing) per minute. Inert diluents such as nitrogen may be used. The dehydroacetylation may also be conducted by heating the diacetate with anhydrous potassium bicarbonate in an inert anhydrous medium, e. g., ether or benzene.

The p-vinylphenyl acetate is preferably isolated from the pyrolyzate by distillation in the presence of a polymerization inhibitor, e. g., hydroquinone, pyrogallol, cuprous salts, etc. The acetic acid may be removed prior to the distillation by washing with water or dilute aqueous alkali or by treatment with basic materials in neutral media.

This invention is broadly applicable to the preparation and polymerization, including copolymerization, of monomeric esters of vinylphenols having the general formula

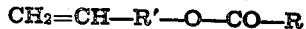

$$CH_2=CH-R'-O-CO-R$$

wherein R is hydrogen or a saturated aliphatic hydrocarbon radical, and R' is an arylene radical, preferably monocyclic, free from open chain unsaturation. Thus, the group R—CO— may be formyl, acetyl, propionyl, butyryl, isobutyryl, lauroyl, palmitoyl, stearoyl, etc. The invention also includes the monomeric and polymeric, including copolymeric, esters of vinylphenols, with saturated aliphatic monobasic acids, e. g., the formate, acetate, propionate, butyrate, isobutyrate, valerate, caproate, caprate, caprylate, laurate, myristate, palmitate, stearate and the mixed esters such as may be obtained from commercial stearic acid or coconut oil acids. This invention contemplates the use of the ortho, meta and para derivatives and of those derivatives which contain saturated alkyl substituents in the ring, examples of such substituents being the methyl, ethyl, propyl, isopropyl, butyl, isobutyl, hexyl, decyl or dodecyl groups. For reason of availability, and satisfactory yields in the preparation, the p-vinylphenyl esters of the lower molecular weight acids, i. e., acids containing up to four carbon atoms, are greatly preferred, and, of these esters, the acetate is outstanding in ease of preparation.

The polymerization of the vinylphenyl ester, e. g., the acetate, whether alone or in admixture, as given in greater detail below, with other vinyl or vinylidene compounds, may be effected in bulk or in solution or emulsion with or without the influence of ultra violet light and with or without added catalyst. The addition of a polymerization catalyst, e. g., benzoyl peroxide, ascaridole, lauroyl peroxide, is generally of advantage in accelerating the polymerization. The polymerization can be carried out at any pressure and at any temperature from 0° C. to the decomposition point of the polymerization mixture.

Vinylphenyl esters such as p-vinylphenyl acetate can be polymerized with any polymerizable compound containing a methylene ($CH_2$) group attached through an ethylenic double bond to a carbon itself attached to at least one negative group, i. e., polymerizable vinyl and vinylidene compounds of which styrene and methyl methacrylate are only typical examples. Other examples include methyl-$\alpha$-chloroacrylate, methyl acrylate, butadiene, chlorprene, vinyl chloride, methylvinyl ketone, vinyl acetate, vinyl phthalimide, 1,1-dichloroethylene, etc. The proportion of vinylphenyl ester in the copolymeric mixtures is not critical and may be varied from mere traces to very large amounts depending upon the physical properties it is desired the resulting interpolymer should have.

The hydrolysis of the vinylphenyl ester, monomer or polymer, can be carried out to any desired degree by suitable change of the variables of time, temperature, medium, and the particular hydrolytic agent used. These hydrolytic agents can be acids, bases, water itself, or alcohols under ester interchange conditions. Thus the hydrolysis may take from 1 minute to twenty-four hours depending on the temperature and hydrolytic agent used. Hydrolysis is slow at 0° C., rapid at 100° C. Sodium in ethanol is very rapid but 0.01 to 1.0N sodium hydroxide may be used. Ammonium hydroxide is less desirable.

The coupling of the partial ester of polyvinylphenol as exemplified in Example VI may be carried out with any aromatic diazonium salt, mononuclear or polynuclear, including benzenediazonium chloride, p-nitrobenzenediazonium chloride, naphthalenediazonium chloride, diazonium salts of naphthylamine-sulfonic acids, etc.

The hydrolysis product may also be used in tanning leather or pelts. For this application it can be used per se, but the treatment is preferably followed by an after treatment with formaldehyde to insolubilize the product.

The polymers and copolymers of vinylphenyl esters such as p-vinylphenyl acetate may be used in the preparation of molded articles, articles for turnery, coatings, in the preparation of polymeric dyes through hydrolysis and subsequent coupling reactions, etc. The polymers of p-vinylphenyl esters compare favorably with styrene and methyl methacrylate in such physical properties as softening point, hardness, and toughness. By varying the proportions and identities of the material copolymerized with the vinylphenyl esters, polymers of varying softening point, hardness, and toughness are obtained. The hydrolyzed polymers are also of especial interest in that they are soluble in alkali and may be regenerated from solutions therein. They may also be coupled with aromatic diazonium salts to give dyes, self dyed resins and colored tannings.

In the specification and claims, the term polymer includes a copolymer, i. e., a plymerizate of a mixture containing a plurality of polymerizable substances as well as a polymerizate of a composition containing but one polymerizable substance, although it may contain other substances which do not polymerize.

The above description and examples are intended to be illustrative only. Any modification of or variation therefrom which conforms to the spirit of the invention is intended to be included within the scope of the claims.

What is claimed is:

1. Process for the preparation of p-vinylphenyl acetate which comprises passing p-hydroxyphenylmethylcarbinol diacetate through a zone heated to 480° C.

2. Process for the preparation of p-vinylphenyl acetate which comprises passing p-hydroxyphenylmethylcarbinol diacetate through a tube heated to 150–700° C. at a rate not exceeding .05 volume per volume of heated space for minute.

3. A vinylaryl ester, the vinylaryl group of which is hydrocarbon.

4. A vinylphenyl ester, the vinylphenyl group of which is hydrocarbon.

5. A p-vinylphenyl ester, the vinylphenyl group of which is hydrocarbon.

6. p-vinylphenyl acetate, the vinylphenyl group of which is hydrocarbon.

7. Monomeric p-vinylphenyl acetate, the vinylphenyl group of which is hydrocarbon.

8. A polymer of a vinylaryl ester, the vinylaryl group of which is hydrocarbon.

9. A polymer of a vinylphenyl ester, the vinylphenyl group of which is hydrocarbon.

10. A polymer of a p-vinylphenyl ester, the vinylphenyl group of which is hydrocarbon.

11. A polymer of p-vinylphenyl acetate.

12. A copolymer of p-vinylphenyl acetate with a polymerizable organic compound having a methylene ($CH_2$) group attached by an ethylenic double bond to a carbon itself attached to a negative group.

13. Polymer obtained by polymerizing a composition in which essentially the sole polymerizable component is p-vinylphenyl acetate.

14. Process which comprises hydrolyzing at least a portion of the acetyl groups of a polymer of p-vinylphenyl acetate by heating the same with a hydrolytic agent.

15. Process of claim 14 wherein the polymer is heated with methanol containing sodium methylate.

16. A product wherein at least a portion of the acetoxy groups of a polymer of p-vinylphenyl acetate are replaced by hydroxyl groups.

17. A product wherein only a portion of the acetoxy groups of a polymer of p-vinylphenyl acetate are replaced by hydroxyl groups.

18. A copolymer of p-vinylphenyl acetate, $CH_2=CH-C_6H_4-O-CO-CH_3$, with styrene.

19. A copolymer of p-vinylphenyl acetate, $CH_2=CH-C_6H_4-O-CO-CH_3$, with methyl methacrylate.

20. A copolymer of p-vinylphenyl acetate, $CH_2=CH-C_6H_4-O-CO-CH_3$, with chloroprene.

VAN VERNON ALDERMAN.
WILLIAM EDWARD HANFORD.